E. T. STARR.
Dental-Engine Hand-Piece.
No. 203,297. Patented May 7, 1878.
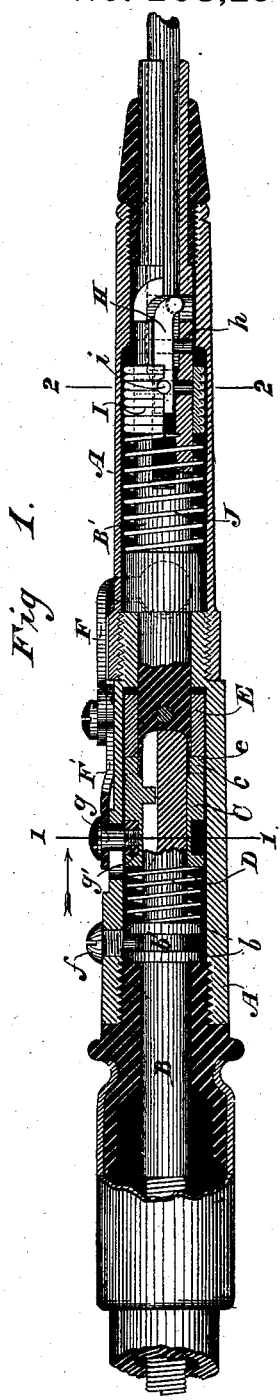
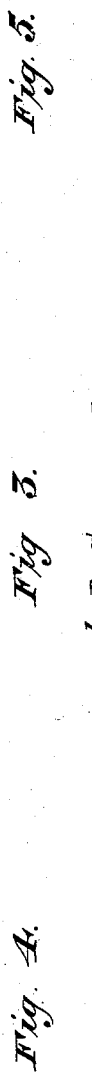
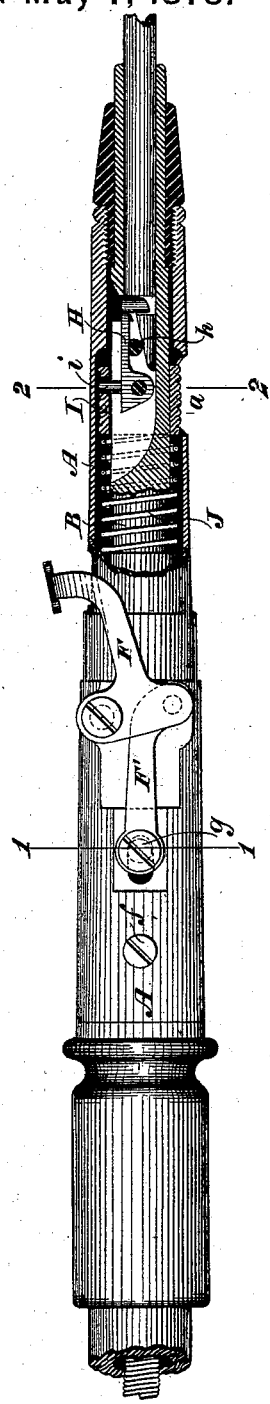
WITNESSES
Wm A Skinkle
Geo W Breck.
INVENTOR
Eli T Starr
By his Attorneys
Baldwin, Hopkins & Peyton

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN DENTAL-ENGINE HAND-PIECES.

Specification forming part of Letters Patent No. 203,297, dated May 7, 1878; application filed December 14, 1877.

*To all whom it may concern:*

Be it known that I, ELI T. STARR, of the city and county of Philadelphia, in the State of Pennsylvania, have invented a certain new and useful Improvement in Dental-Engine Hand-Pieces, of which the following is a specification:

My invention relates to that class of hand-pieces having a transversely-divided drill spindle, mandrel, or chuck, the sections of which are connected by a clutch controlled by the operator, whereby the portion of the spindle carrying the tool-locking mechanism may be disconnected from the driving-power and thrown into action again at the will of the operator, thus placing the operating-tool completely under control. Exemplifications of hand-pieces of this class will be found in Letters Patent of the United States granted to John W. Gilbert, January 12, 1875, and to myself, December 5, 1876.

The object of my present invention is to improve the clutch and controlling device by which the clutch is operated. The subject-matter claimed hereinafter, specifically, will be designated.

In the accompanying drawings, Figure 1 represents a vertical longitudinal section through my improved hand-piece; Fig. 2, a side elevation, partly in section, at right angles to Fig. 1; Fig. 3, a longitudinal section of a portion of the hand-piece at right angles to Fig. 1, the clutch being shown as retracted to disconnect the parts of the spindle; Fig. 4, a transverse section of the hand-piece on the line 1 1 of Figs. 1 and 2; and Fig. 5, a similar view on the line 2 2 of said figures.

The sectional casing A of the hand-piece envelops a rotating transversely-divided two-part drill spindle or chuck, B B'.

The rear swiveling section of the casing and the section B of the spindle are shown as connected, respectively, with the flexible non-rotating sheath and flexible driving-shaft of the well-known S. S. White dental engine.

Upon the adjacent ends of the divided spindle is mounted a clutch or coupling, to connect or disconnect the sections. This clutch consists of a sleeve, C, capable of sliding freely endwise upon the section B of the chuck, but prevented from turning by the usual longitudinal groove and feather, and adapted to engage by its lugs $c$, when thrown forward by a spring, D, interposed between the sleeve and a collar, $b$, on the spindle, with a groove or grooves, $e$, formed in a ring or annulus, E, which is firmly secured upon the recessed inner end of the section B' of the two-part chuck.

The collar $b$ on the spindle is provided with an annular groove, $b'$, for the reception of the end of a set-screw, $f$, projecting through the casing, to prevent endwise movement of the rear section of the divided spindle while permitting its free revolution.

The clutch above described is substantially the same as that shown in my patent of December 5, 1876, hereinbefore referred to, except that in that patent the clutch is operated by a thimble mounted upon the outside of the hand-piece, near its forward end, through the medium of a lug or pin directly engaging the clutch, the thimble being within easy reach of the operator's fingers.

In my present invention the chuck is divided near the rear end of the hand-piece, and the clutch is operated by means of a pivoted elbow-lever, F, extending forward outside the casing to within easy or convenient reach of the operator's fingers when the instrument is in use, the lever being connected with the clutch by means of a link-rod, F', outside the casing, the rear end of which rod carries a pin, $g$, working in a longitudinal slot in the casing, and having its end inserted in an anti-friction block, $g'$, mounted in an annular groove in the sliding portion of the clutch.

Owing to the action of the spring D, the clutch is normally held in a forward position, connecting the sections of the spindle, and virtually making a solid spindle or chuck, and at the same time the finger-lever is also held in its raised or normal position, ready to be depressed by the operator to disconnect or unclutch the sections.

The forward section B' of the divided spindle or chuck carries the tool-locking mechanism, and is socketed for the reception of the shank of the operating-tool, as usual.

The tool-locking mechanism shown in the drawings is the invention of W. S. How, of Cincinnati, Ohio, and is fully described in a pending application filed by him, and, consequently, need not be described herein. Other approved forms of tool-locking mechanism may, however, be employed in a hand-piece embodying my invention.

From the foregoing description of my invention it will be seen that while the instrument is in use the operator has complete control over the operating-tool, as he is enabled by the depression or release of the finger-lever instantly to stop or start the portion of the spindle carrying the tool without interruption to the driving-power, and when so disconnected the tool-locking mechanism may readily be manipulated to remove, replace, or change the operating-tools in the same manner as if the driving-power were at rest.

I claim as of my own invention—

The combination, substantially as hereinbefore set forth, of a casing, a divided spindle or chuck mounted therein and carrying tool-locking mechanism, a clutch between the sections, and an elbow-lever pivoted upon the casing, and acting upon the clutch through the medium of a link carrying a pin or projection working through a longitudinal slot in the casing.

In testimony whereof I have hereunto subscribed my name.

ELI T. STARR.

Witnesses:
WM. D. BALDWIN,
WM. J. PEYTON.